UNITED STATES PATENT OFFICE 2,196,447

NITROGEN - CONTAINING ORGANIC COMPOUNDS AND PROCESS FOR THEIR PREPARATION

Adrianus Johannes van Peski, Amsterdam, Netherlands, assignor to Shell Development Company, San Francisco, Calif., a corporation of Delaware No Drawing. Application July 2, 1938, Serial No. 217,278. In Great Britain July 8, 1937

16 Claims. (Cl. 260—438).

This invention relates to a process for the production of valuable imidines and acyl amidines and/or the tautomers of such compounds, which process comprises reacting an aliphatic amidine, or a compound capable of yielding an aliphatic amidine under the conditions of execution of the process, with a suitable iminating agent or acylating agent.

The invention also relates to novel and valuable imidines and acylamidines, and their tautomers, as well as metal derivatives of such compounds, which compounds are adapted to a variety of commercial uses. The novel compounds are useful raw materials in the production of pharmaceutical preparations, as assistants in the textile industry, as colorants, as agents and components in preparations for destroying noxious organisms, as agents for improving the quality of lubricating compositions, as agents for improving the properties of motor fuels with respect to their anti-knock value, and they may be advantageously employed, alone or in admixture with other agents, for still other purposes.

The imidines and acyl amidines prepared in accordance with the process of the invention may be represented by the general formula:

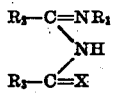

or tautomeric forms thereof wherein $R_2$ represents hydrogen or an aliphatic or cycloaliphatic radical and $R_1$ and $R_3$ are the same or different and represent hydrogen atoms, or alkyl radicals, aralkyl radicals, cyclo-aliphatic radicals or aryl radicals which may or may not be further substituted, and wherein X represents an oxygen atom or the radical $NR_4$. When X represents the radical $NR_4$, $R_4$ may be a hydrogen atom or any alkyl, aralkyl, cycloaliphatic or aryl radical which may or may not be further substituted. The products are designated as acyl amidines when X in the above formula represents the oxygen atom. When X represents the radical $NR_4$, the compound is designated as an imidine. The compounds need not be of open-chain character as represented by the formula; they may be cyclic. For example, $R_2$ and $R_3$ together may represent a divalent organic radical, or $R_2$ and $R_3$ may be linked together by one or more intervening carbon atoms and/or other atoms or radicals.

The aliphatic amidines which are reacted with an iminating agent or an acylating agent in accordance with the process of the invention may be of open-chain or cyclic character and contain one or a plurality of characteristic amidine groups

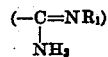

The simpler amidines suitable for use in the execution of the invention may be represented by the general formula

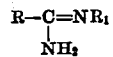

wherein R and $R_1$ are the same or different and represent hydrogen atoms or alkyl, or cycloaliphatic radicals which may or may not be further substituted by suitable inorganic and/or organic substituents. Suitable representative amidines are: formamidine, acetamidine, propionamidine, the butyramidines, oxalamidine, acrylamidine, and the like and their homologues, analogues and suitable substitution products.

The term "iminating agent" is used herein and in the appended claims to designate a group of agents the members of which are capable of reacting with amidines under the conditions of execution of the process of the invention to introduce into the structure of the amidine, by replacement of a hydrogen atom of the $-NH_2$ group, at least one

group. The iminating agents may be of open-chain or cyclic character. Representative suitable sub-groups of iminating agents are the nitriles, the imino-halides and the imino-ethers, although numerous iminating agents not falling within these three subgroups are suitable. Suitable nitriles may be represented by the formula R—CN, wherein R represents an alkyl, aralkyl, cycloaliphatic or aryl radical which may or may not be further substituted. Readily available nitriles are acetonitrile, propionitrile, the butyronitriles, benzonitrile and the like. The imino-halides may be represented by the general formula

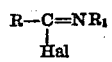

wherein R and $R_1$ are the same or different and represent hydrogen atoms or alkyl, aralkyl, cycloaliphatic or aryl radicals which may or may not be further substituted, and —Hal represents a halogen atom. The imino-ethers may be represented by the same general formula wherein —Hal is replaced by the group —OR₂ wherein R₂ represents an alkyl, aralkyl, cycloaliphatic or aryl radical which may be the same or different than R. Representative imino-halides are: acetchlorimide, propionchlorimide, the butyrchlorimides, benzochlorimide, pivalyl - allyl - chlorimide, etc. Representative imino ethers are $$CH_3C(NH)OCH_3, \quad C_2H_5C(NH)OCH_3,$$
$$C_3H_7C(NH)OC_2H_5, \quad C_6H_5C(NH)OCH_3$$

and the like.

The reaction whereby an aliphatic amidine is reacted with an iminating agent in accordance with the process of the invention to yield an imidine may be represented by the following equation illustrating the reaction of a simple amidine with a simple imino-halide (tautomeric forms omitted for the sake of clarity):

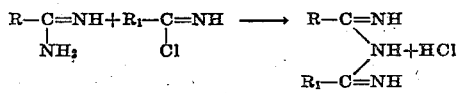

The term "acylating agent" is used herein and in the appended claims to designate a group of agents the members of which are capable of reacting with amidines under the conditions of execution of the process of the invention to introduce into the structure of the amidine, by replacement of a hydrogen atom of the —NH₂ group, at least one

group. The acylating agents may be of open-chain or cyclic character. Representative suitable sub-groups of acylating agents are the carboxylic acids, the carboxylic acid anhydrides, the carboxylic acid halides, the ketenes, etc. Suitable carboxylic acids are formic, acetic, propionic, butyric, isobutyric, acrylic, methacrylic, benzoic, cinnamic, oxalic, phthalic, succinic, maleic, pyruvic and the like and their homologues, analogues and suitable substitution products. Suitable carboxylic acid anhydrides and carboxylic acid halides are the anhydrides and acid halides, respectively, of the above named as well as other carboxylic acids. Suitable ketenes are ketene $CH_2=CO$, methyl ketene $CH_3CH=CO$, phenyl ketene $C_6H_5CH=CO$, diphenyl ketene $(C_6H_5)_2C=CO$ and the like and their homologues, analogues and suitable substitution products.

The reaction whereby an aliphatic amidine is reacted with an acylating agent in accordance with the process of the invention to yield an acyl amidine may be represented by the following equation illustrating the reaction of a simple amidine with a carboxylic acid (tautomeric forms omitted for clarity):

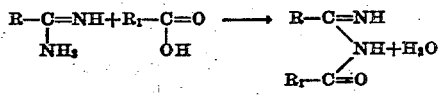

The process of the invention may be executed in any suitable type of apparatus. The reactants, and, if desired, a suitable solvent or dispersing agent, may be charged in any suitable manner to a reaction vessel, such as an autoclave, which is preferably equipped with suitable heating and cooling means and means for agitating its contents as by mechanical stirring. Suitable solvents or dispersing agents which may, if desired, be advantageously employed are hydrocarbons and hydrocarbon mixtures such as benzene, hexane, octane, gasoline, diisobutylene, etc.; the alcohols such as ethanol, propanol, the butanols, etc.; the ethers such as ethyl ether, ethyl propyl ether, diisopropyl ether and the like.

In general, the process is advantageously executed at temperatures of from about 20° C. to about 150° C. Higher or lower temperatures may be used when necessary or desirable. The process is in general conveniently executed at about atmospheric pressure. Superatmospheric pressure or subatmospheric pressures may be used when necessary or desired. The process is usually executed with the reactants in the liquid phase.

The imidines and acyl amidines may be recovered from the reaction mixture in any suitable manner, the specific mode of recovery being adapted to the nature of the product. Suitable modes of recovery include extraction, distillation, etc.

The following specific examples illustrate a suitable mode of executing the process of the invention. It is to be understood that the examples are for illustrative purposes, and that the invention is not to be regarded as limited to the specific reactants, conditions, or mode of operation therein described.

*Example I*

About 15.5 parts by weight of pivalyl-allyl-imide chloride $$((CH_3)_3C—C=N—CH_2—CH=CH_2)$$
$$|$$
$$Cl$$

which may be prepared by reacting pivalyl chloride with allyl amine and treating the resulting pivalyl-allyl-amide with phosphorus pentachloride to form pivalyl-allyl-amide chloride which loses HCl spontaneously giving the desired pivalyl-allyl-imide chloride, were dissolved in about 15 parts by weight of benzene. This solution was added slowly to a cooled solution consisting of about 8 parts by weight of butyramidine dissolved in about 12 parts by weight of benzene. After the addition of the reactants was complete, the reaction was completed by heating the mixture to a temperature of about 80° C. for about 1 hour. The benzene was removed by evaporation. The residue was dissolved in methyl ethyl ketone, and the product recovered in purified form by crystallization therefrom. Analysis of the product, which had a melting point of from 167° C. to 168° C., showed it to have the structural formula:

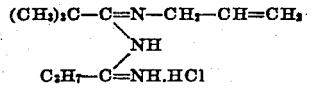

This novel compound may be designated as (allyl-pivalo)-butyr-imidine hydrochloride.

*Example II*

To 30.4 grams of ethyl acetamidine dissolved in about 150 cubic centimeters of absolute ether were added 14.3 grams of powdered sodium hydroxide. Then 37.7 grams of butyryl chloride dissolved in 80 cubic centimeters of absolute ether was added dropwise to the mixture. The temperature was kept at about 25° C. during the reaction by cooling. The sodium chloride precipitate formed was filtered off and the ether evaporated. The remaining product was then fractionally distilled in vacuo. The yield of butyryl ethyl acetamidine, boiling point 78°–79° C. under 0.25 mm. of mercury, was 37.0 grams.

Example III

By reacting acetyl chloride with methyl butyramidine

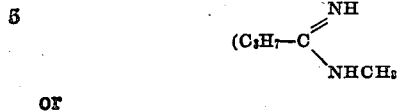

or

under conditions analogous to those used in Example II, acetyl methyl butyramidine boiling at 122° to 124° C. under 11 mm. of mercury was obtained. In the same way butyryl allyl butyramidine, boiling point 140°–144° C. under 11 mm. of mercury was obtained by reacting allyl butyramidine with butyryl chloride, and propionyl methyl acetamidine, boiling point 120°–121° C. under 12 mm. mercury, was prepared from methyl acetamidine and propionyl chloride.

Example IV

To 13.7 grams of allyl butyramidine dissolved in 15 cubic centimeters of benzene was slowly added drop by drop, 17.3 grams of pivalyl-allyl-imide chloride dissolved in 20 cubic centimeters of benzene. The hydrochloride of allyl pivalo allyl butyrimidine was formed with evolution of heat but the temperature was kept at about 0° C. by cooling. The reaction mixture was shaken for several hours at room temperature. The product was then recovered in a substantially pure state by evaporation of the solvent in vacuo.

As is shown in the examples, when one of the products of the reaction is a hydrogen halide, or when the reaction is effected in the presence of a hydrogen halide, the imidine or acyl amidine may be obtained in the form of its hydrohalide.

Metal derivatives of the compounds of my invention may be prepared by reacting them with suitable compounds of the desired metal. Thus, for example, sodium compounds of the products produced in Examples II and III have been prepared by reaction of the acyl amidines with sodium ethylate. The corresponding copper compounds were produced by reacting the sodium derivatives with copper compounds in an absolute alcohol solution. In preparing metal compounds from products such as those of Example IV which are in the form of the hydrochloric acid salt, an amount of sodium ethylate must of course be used sufficient to first liberate the imidine and to convert it to the sodium salt.

The novel imidines and acyl amidines, and the tautomers of these compounds, prepared in accordance with the process of the invention are all nitrogen-containing organic compounds wherein at least one carbon atom is linked by a double bond to one nitrogen atom and by a single bond to another nitrogen atom. The imidines proper contain two carbon atoms linked by double bonds to separate nitrogen atoms and by single bonds to the same imino radical. In the tautomeric form of the imidines, one carbon atom is linked by a double bond to a nitrogen atom which in turn is linked by a single bond to a carbon atom, each of said carbon atoms being linked, respectively, to other nitrogen atoms, the former by a single bond, and the latter by a double bond. In another form which the imidines may take is characterized by the presence of two carbon atoms linked by double bonds to separate nitrogen atoms and by single bonds to a nitrogen atom which is linked to a third carbon atom. Using the same symbols as in the general formula, the various forms which the imidines may take may be represented as follows:

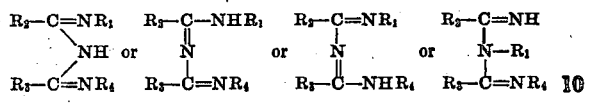

The acyl amidines proper contain an imino radical linked by a single bond to a carbon atom which in turn is linked by a double bond to a nitrogen atom, the other bond of the imino radical being linked to the carbon atom of a carbonyl group. The acyl amidine tautomers contain a nitrogen atom linked by a double bond to a carbon atom which in turn is linked by a single bond to another nitrogen atom, and by a single bond to the carbon atom of a carbonyl group. The acyl amidines may also be characterized by the presence in the molecule of a nitrogen atom directly linked to three carbon atoms one of which is linked by a double bond to another nitrogen atom and another of which is the carbon atom of a carbonyl group. These structures may be represented by the following formulae:

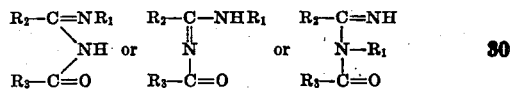

or corresponding enol forms.

The invention contemplates the metal derivatives of the imidines, acyl amidines and their tautomers herein described. One or more of the hydrogen atoms which are linked to nitrogen atoms or carbon atoms in the imidines, acyl amidines and their tautomers may be replaced by suitable monovalent or polyvalent metal or metal-containing radicals. Representative metal derivatives are those containing silver, copper, zinc, nickel, iron, lead and the like metals.

A number of copper compounds from various products obtained according to the present case have been tested on their anti-knock action. The copper compounds were added to a paraffinous straight-run gasoline having an octane number of 40, and the following results were obtained:

| Copper compound of— | Percent by weight cu. in. gasoline | Octane number |
| --- | --- | --- |
| (1) Acetyl ethyl butyramidine | 0.08 | 57.5 |
| (2) Butyryl allyl butyramidine | 0.10 | 50.5 |
| (3) Butyryl ethyl acetamidine | 0.075 | 56 |
| (4) Propionyl methyl acetamidine | 0.10 | 61.5 |
| (5) Butyryl butyramidine | 0.07 | 45.5 |
| (6) Allyl pivalo allyl butyramidine | 0.05 | 43.5 |

The corresponding cobalt compounds give greater increases in octane number under similar conditions. Copper derivatives of cyclic compounds of the type of acetyl cyclohexylacetamidine, N-phenyl-N-acetyl-benzamidine and the like are also anti-knock agents.

My invention provides a new source for a wide variety of valuable products. The invention is capable of wide variation not only with respect to the new acyl amidines and imidines which may be produced but also in regard to the methods used for their preparation. Thus, for example, another method of producing the acyl amidines of my invention may be illustrated by the following example.

Example V

Hydrochloric acid gas is introduced into butyronitrile at 0° up to the point of saturation, after which the solution is left over for some weeks in a closed vessel at room temperature. Subsequently the unconverted hydrochloric acid and butyronitrile are vaporized, whereupon the remainder crystallizes out. The presumable structure of this substance is:

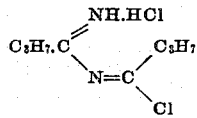

the hydrochloric acid salt of the imide chloride of butyryl butyramidine. This may have been formed by addition of 1 mol butyronitrile (+1 mol HCl) to 1 mol butyr imide chloride, which latter substance in turn has been formed by the addition of hydrochloric acid to butyronitrile. The reaction equation for the conversions is as follows:

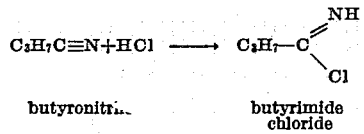

butyronitrile.    butyrimide chloride

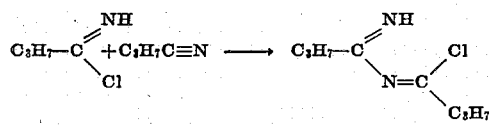

imide chloride of butyryl butyramidine

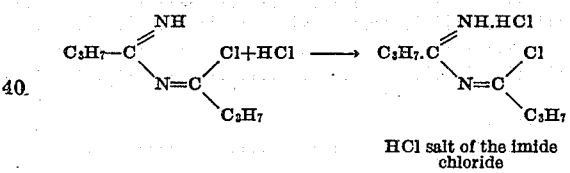

HCl salt of the imide chloride

Upon careful reaction of diluted lye the molecule of hydrochloric acid is eliminated again, whilst at the same time the other chlorine atom is replaced by a hydroxyl group. The substance thus obtained is the tautomeric form of the butyryl butyramidine:

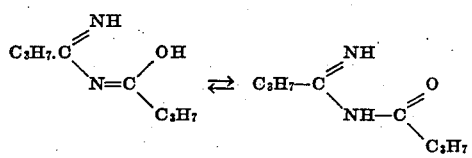

Since the action of water may even go further (the =NH group being replaced by =O, so that dibutyramide is formed), the hydrolysis is carried out in the presence of an organic solvent immiscible with water, copper acetate being added immediately after the addition of lye. In this way the copper compound of the butyryl butyramidine is formed, which very readily dissolves in organic solvents (such as pentane) and is thus withdrawn from the decomposing effect of the water. Finally, by recrystallization from pentane at a low temperature, the copper compound is obtained in the pure state, melting pt. 82°–83° C.

It will thus be evident that in accordance with the process of my invention imidines and acyl amidines or their tautomeric forms or derivatives thereof may be produced by causing nitriles, including aliphatic and cyclic, particularly cycloaliphatic nitriles or substances derived therefrom such, for example, as amidines, to react with suitable iminating agents and the like.

While I have described my invention in a detailed manner and illustrated suitable modes of executing the same, it is to be understood that modifications may be made and that no limitations other than those imposed by the scope of the appended claims are intended.

I claim as my invention:

1. A process for the production of useful nitrogen-containing organic compounds wherein at least one carbon atom is linked by a double bond to one nitrogen atom and by a single bond to another nitrogen atom which comprises reacting substantially equimolecular quantities of an aliphatic amidine and an organic compound of the class consisting of the iminating agents which react with the aliphatic amidine to replace a hydrogen atom of the —NH₂ group thereof by a

group and the acylating agents which react with the aliphatic amidine to replace a hydrogen atom of the —NH₂ group thereof by a $$-\overset{|}{C}=O$$

group.

2. A process for the production of useful nitrogen-containing organic compounds wherein at least one carbon atom is linked by a double bond to one nitrogen atom and by a single bond to another nitrogen atom which comprises reacting an aliphatic amidine with a substantially equimolecular quantity of an organic compound of the class consisting of the iminating agents which react with the aliphatic amidine to replace a hydrogen atom of the —NH₂ group thereof by a

group and the acylating agents which react with the aliphatic amidine to replace a hydrogen atom of the —NH₂ group thereof by a

group, the reaction being effected in the liquid phase in the presence of a substantially inert liquid solvent.

3. A process for the production of useful nitrogen-containing organic compounds wherein at least one carbon atom is linked by a double bond to one nitrogen atom and by a single bond to another nitrogen atom which comprises reacting an aliphatic amidine with a substantially equimolecular quantity of an organic compound of the class consisting of the iminating agents which react with the aliphatic amidine to replace a hydrogen atom of the —NH₂ group thereof by a $$-\overset{|}{C}=NH$$

group and the acylating agents which react with the aliphatic amidine to replace a hydrogen atom of the —NH₂ group thereof by a

group, the reaction being effected in the liquid phase at a temperature of from 20° C. to 150° C.

4. A process for the production of an imidine which comprises reacting an aliphatic amidine with an iminating agent which reacts with the aliphatic amidine to replace a hydrogen atom of the —NH₂ group thereof by a

group.

5. A process for the production of an acyl amidine which comprises reacting an aliphatic amidine with a substantially equimolecular quantity of an acylating agent which reacts with the aliphatic amidine to replace a hydrogen atom of the —NH₂ group thereof by a

group.

6. A process for the production of an imidine which comprises reacting an aliphatic amidine with an iminating agent of the class consisting of the organic nitriles, imino-halides and imino-ethers.

7. A process for the production of an imidine which comprises reacting an aliphatic amidine with an imino-halide.

8. A process for the production of an acyl amidine which comprises reacting an aliphatic amidine with a substantially equimolecular quantity of an acetylating agent of the class consisting of the carboxylic acids, the carboxylic acid anhydrides, the carboxylic acid halides and the ketenes.

9. A process for the production of an acyl amidine which comprises reacting an aliphatic amidine with a substantially equimolecular quantity of a carboxylic acid.

10. A process for the production of (allyl-pivalo)-butyr-imidine hydrochloride which comprises reacting butyramidine with pivalyl-allyl-imino chloride.

11. A novel class of organic compounds consisting of the nitrogen-containing organic compounds possessing an imino radical linked by single bonds to two carbon atoms one of which is linked by a single bond to an aliphatic radical and by a double bond to a nitrogen atom which is linked by a single bond to a hydrocarbon radical and the other of which said carbon atoms is linked by a double bond to an oxygen atom and by a single bond to a substituent of the group consisting of the hydrogen atom and the hydrocarbon radicals and the tautomers of said organic compounds.

12. A novel class of nitrogen-containing organic compounds consisting of the acyl amidines of the general formula

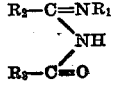

wherein R₁ and R₃ each represents a hydrocarbon radical and R₂ represents a substituent of the group consisting of the hydrogen atom and aliphatic radicals, and the tautomers of said acyl amides.

13. A class of novel imidine compounds consisting of the compound of the formula:

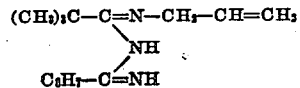

and the hydrohalides of said compound.

14. A class of novel unsaturated imidines consisting of the unsaturated imidines of the general formula:

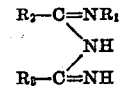

wherein R₁, R₂ and R₃ represent hydrocarbon radicals at least one of which is an aliphatic unsaturated hydrocarbon radical, the tautomers of said unsaturated imidines, the hydrohalides of said unsaturated imidines, and the heavy metal derivatives of said unsaturated imidines.

15. The heavy metal derivatives of compounds selected from the group consisting of the acyl amidines of the general formula

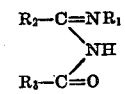

wherein R₁ and R₃ each represents a hydrocarbon radical and R₂ represents a substituent of the group consisting of the hydrogen atom and aliphatic radicals, and of the tautomers of said acyl amidines.

16. The copper salts of acyl amidines having the general formula

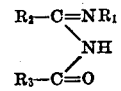

wherein R₁ and R₃ each represents a hydrocarbon radical and R₂ represents a substituent of the group of the hydrogen atom and aliphatic radicals, and of the tautomers of said acyl amidines.

ADRIANUS JOHANNES VAN PESKI.